Figure 1:
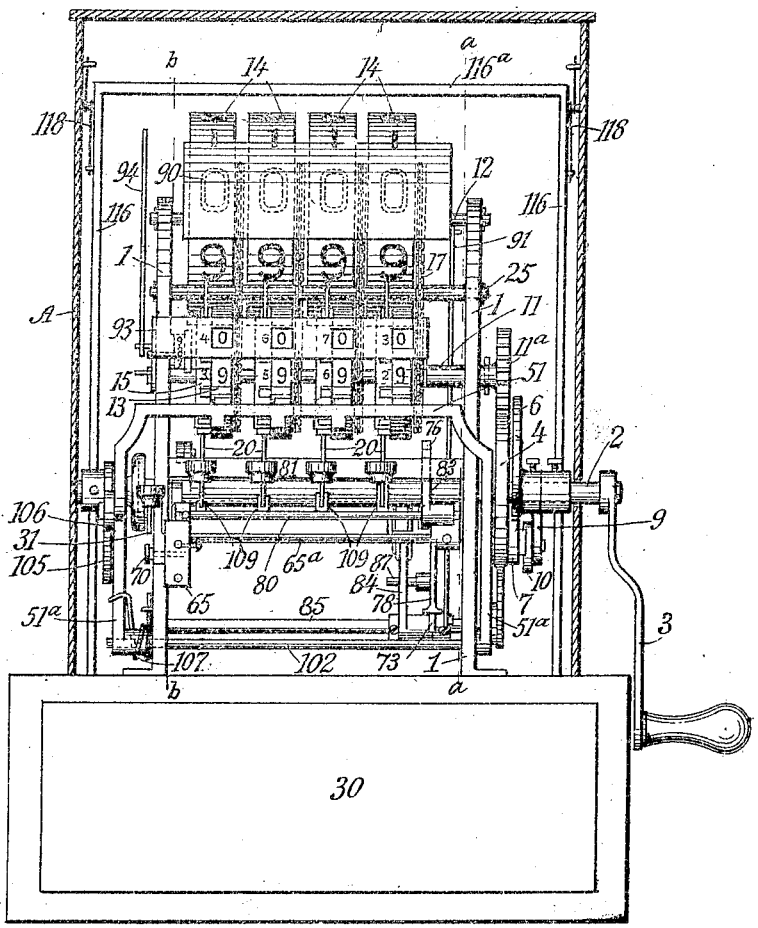

(No Model.) 7 Sheets—Sheet 1.

J. B. BENTON & E. B. HESS.
CASH REGISTER.

No. 552,463. Patented Dec. 31, 1895.

Witnesses.
Geo. Ritter
H. B. Gallatin

Inventors
J. B. Benton.
E. B. Hess.
By D. B. Gallatin
Atty (No Model.) 7 Sheets—Sheet 2.
J. B. BENTON & E. B. HESS.
CASH REGISTER.
No. 552,463. Patented Dec. 31, 1895.
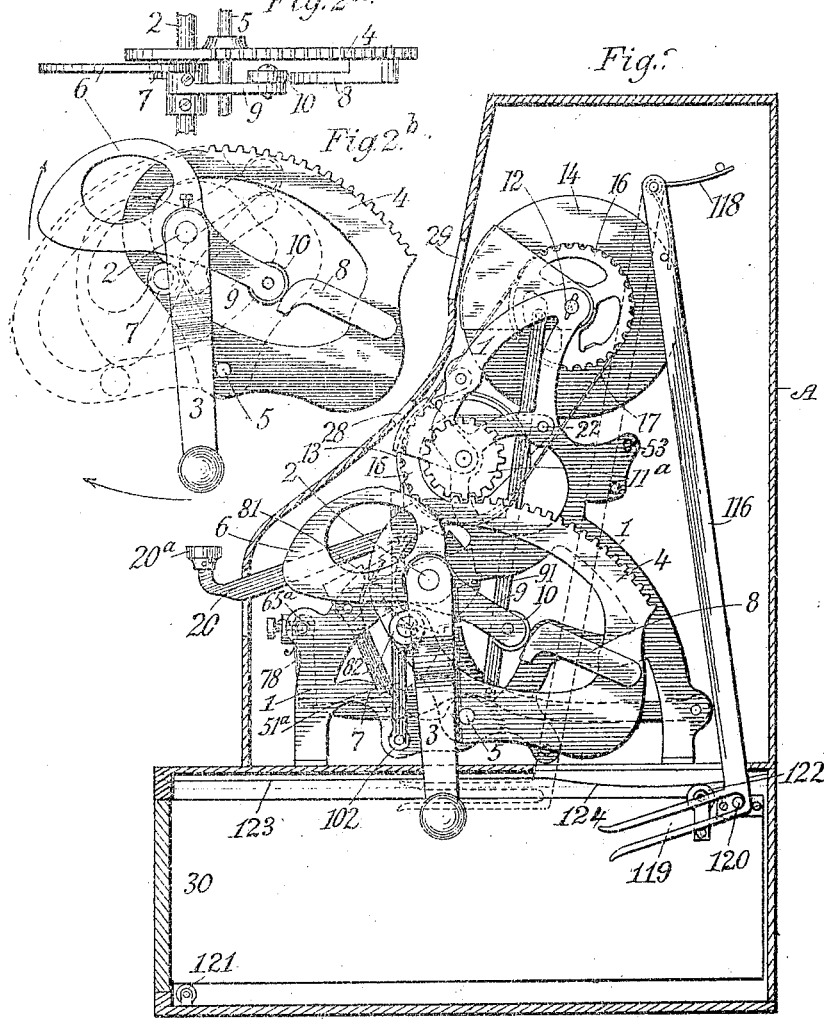
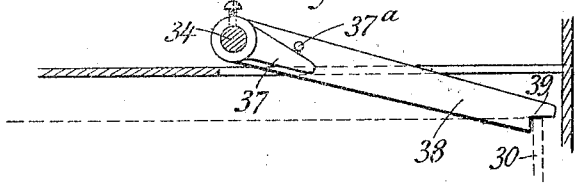
Witnesses.
Geo. Ritter.
H. C. Gallatin.
J. B. Benton,
E. B. Hess, Inventors.
By D. B. Gallatin,
Atty.

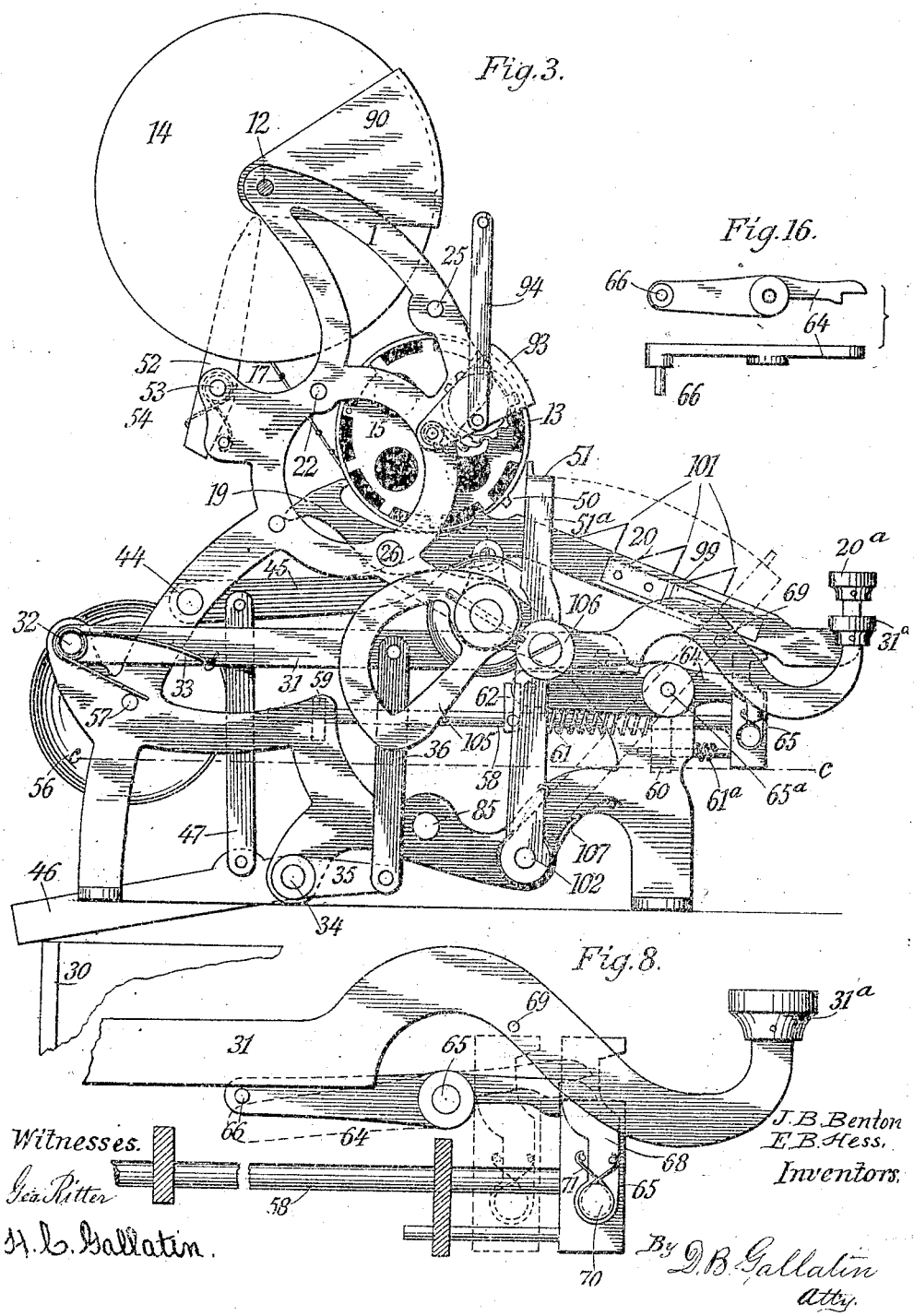

(No Model.) 7 Sheets—Sheet 4.
J. B. BENTON & E. B. HESS.
CASH REGISTER.
No. 552,463. Patented Dec. 31, 1895.
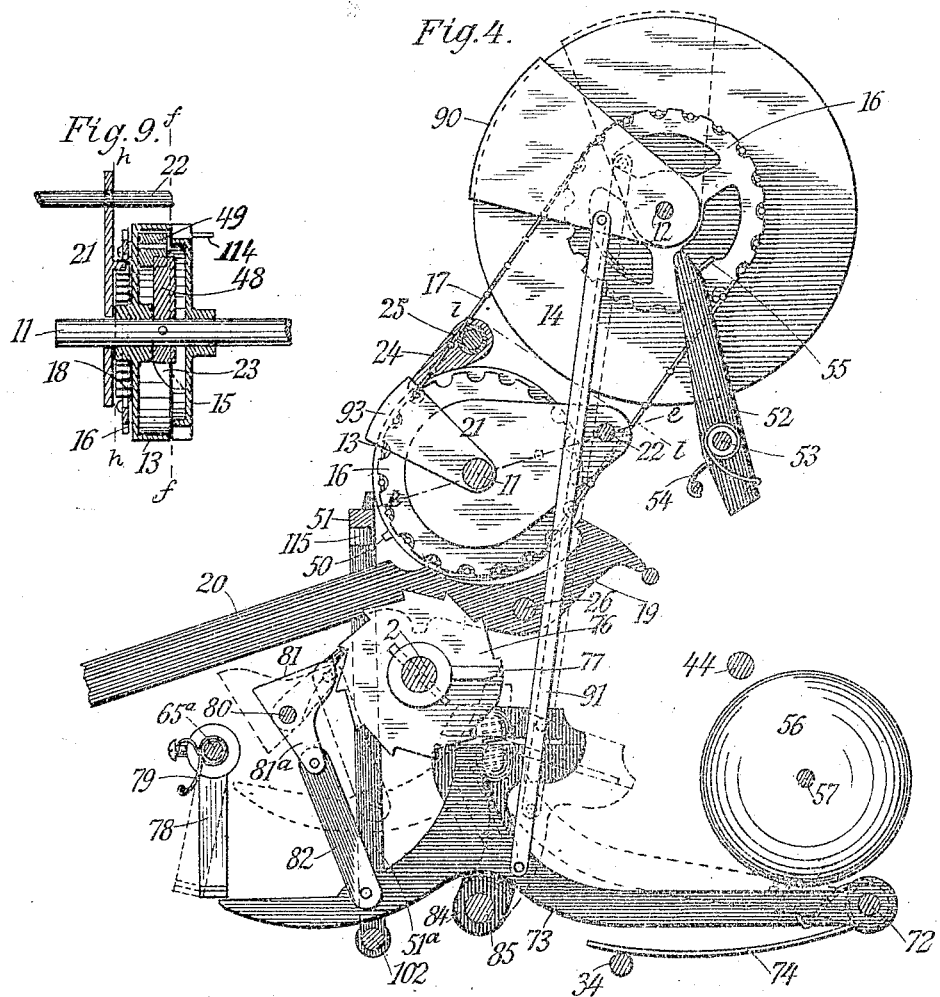
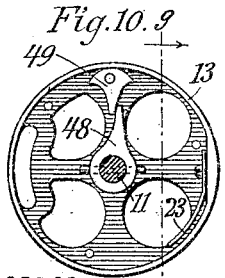
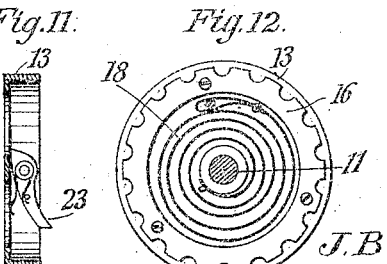
Witnesses
Geo. Ritter
H. C. Gallatin
J. B. Benton,
E. B. Hess,
Inventors.
By D. B. Gallatin
Atty.

(No Model.)                                                    7 Sheets—Sheet 5.
J. B. BENTON & E. B. HESS.
CASH REGISTER.
No. 552,463.                                    Patented Dec. 31, 1895.
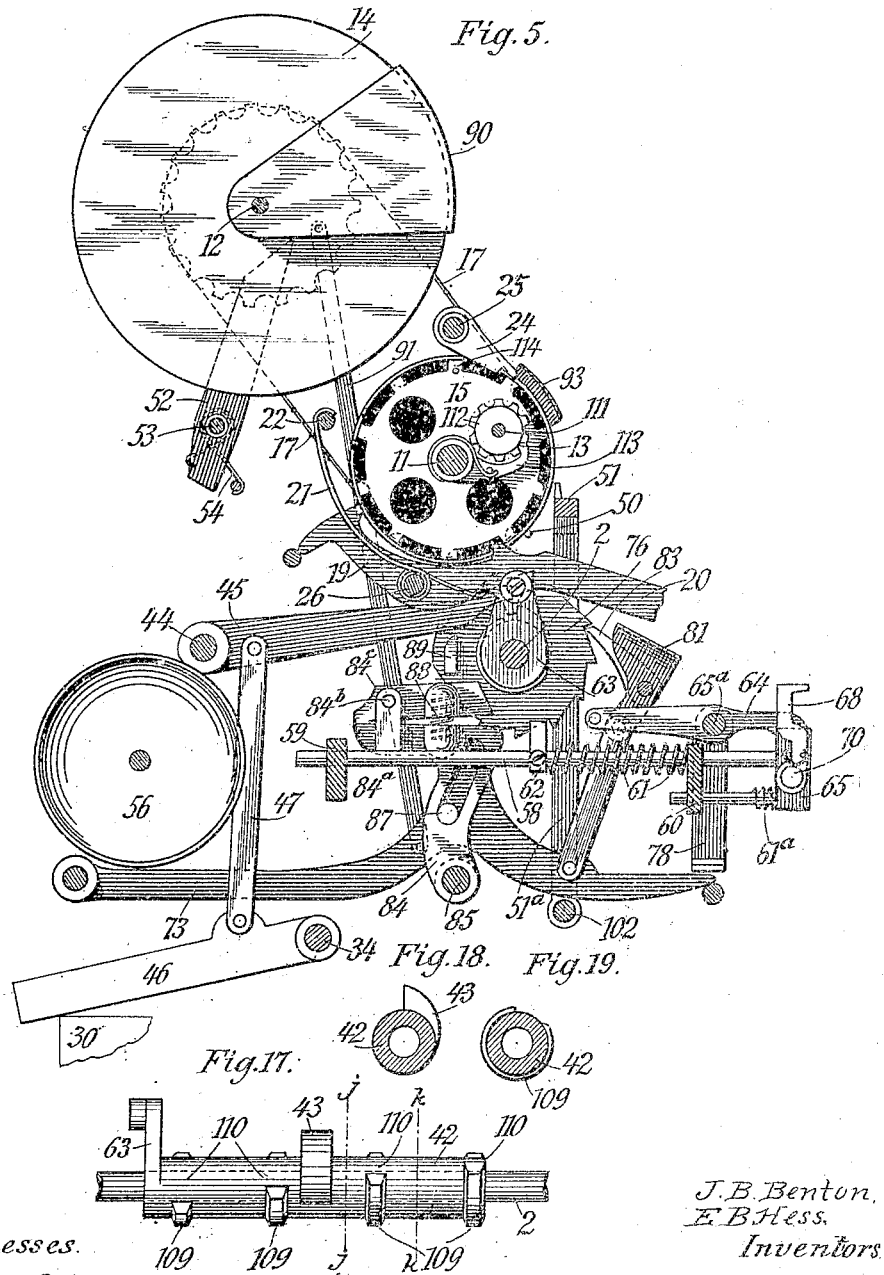
Witnesses.
Geo. Ritter.
H. L. Gallatin.
J. B. Benton,
E. B. Hess,
Inventors
By D. B. Gallatin
Atty (No Model.) 7 Sheets—Sheet 6.
J. B. BENTON & E. B. HESS.
CASH REGISTER.
No. 552,463. Patented Dec. 31, 1895.
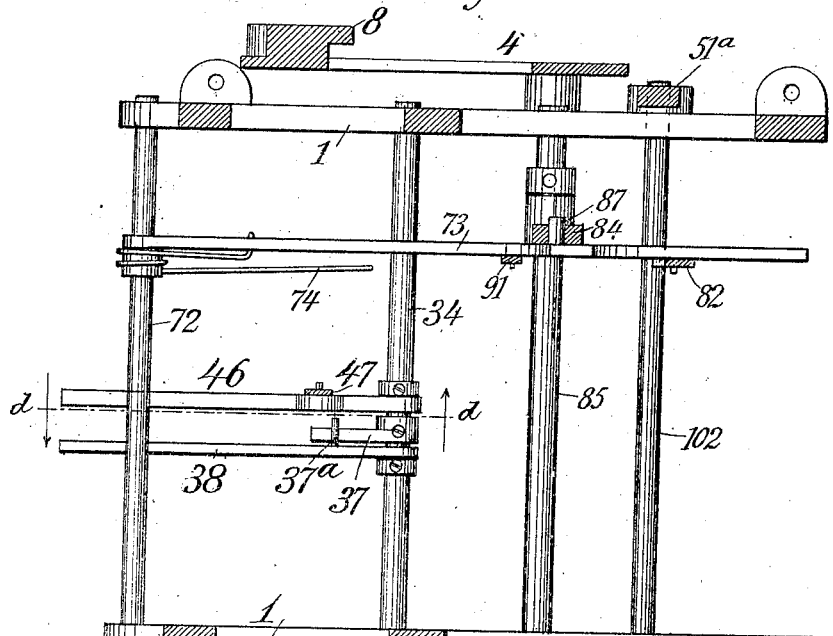
Fig. 6.
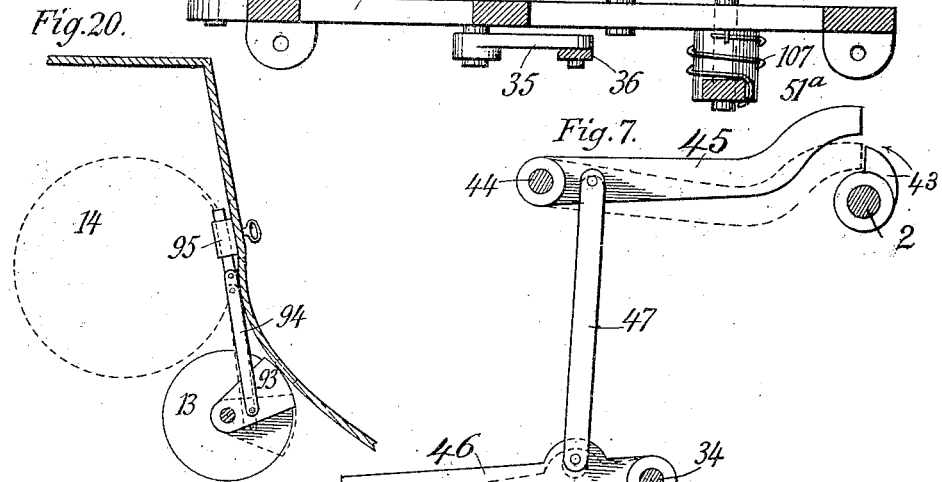
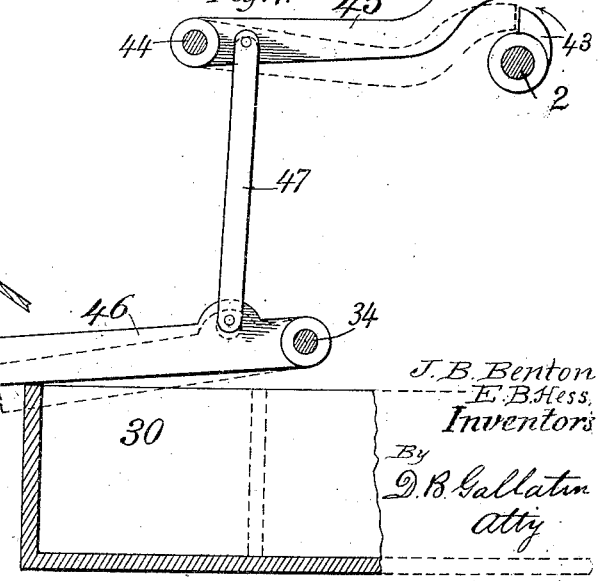
Fig. 20.
Fig. 7.
Witnesses,
Geo. Ritter
H. C. Gallatin.
J. B. Benton
E. B. Hess,
Inventors
By D. B. Gallatin
Atty (No Model.) 7 Sheets—Sheet 7.

J. B. BENTON & E. B. HESS.
CASH REGISTER.

No. 552,463. Patented Dec. 31, 1895.

Witnesses.
Geo. Ritter
H. C. Gallatin.

J. B. Benton,
E. B. Hess.
Inventors,
By
D. B. Gallatin,
Atty

UNITED STATES PATENT OFFICE.

JOHN B. BENTON, OF ELIZABETH, NEW JERSEY, AND EDWARD B. HESS, OF NEW YORK, N. Y., ASSIGNORS TO THE METROPOLITAN REGISTER COMPANY, OF NEW YORK.

CASH-REGISTER.

SPECIFICATION forming part of Letters Patent No. 552,463, dated December 31, 1895.

Application filed August 28, 1895. Serial No. 560,305. (No model.)

*To all whom it may concern:*

Be it known that we, JOHN B. BENTON, residing at Elizabeth, in the county of Union and State of New Jersey, and EDWARD B. HESS, residing at New York, in the county of New York, State of New York, citizens of the United States, have invented certain new and useful Improvements in Cash-Registers; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to that class of registers in which registration is effected by the rotation of numbered indicating-wheels adapted to be rotated to different positions to indicate different amounts and to be reset after each registration preparatory to the next operation. The objects aimed at are cheapness of construction, reliability, ease of manipulation, and to prevent surreptitious or fraudulent operation by unauthorized persons in the absence of those having charge of the machine.

To these ends the invention consists in the construction and combinations of parts, as hereinafter fully described and claimed.

Figure 13:
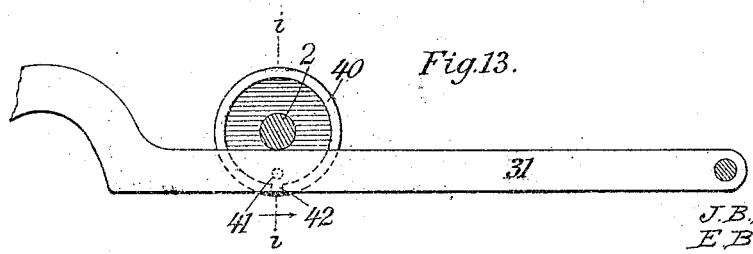
Figure 14:
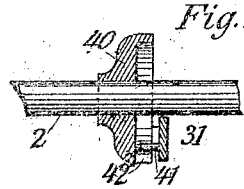
Figure 21:
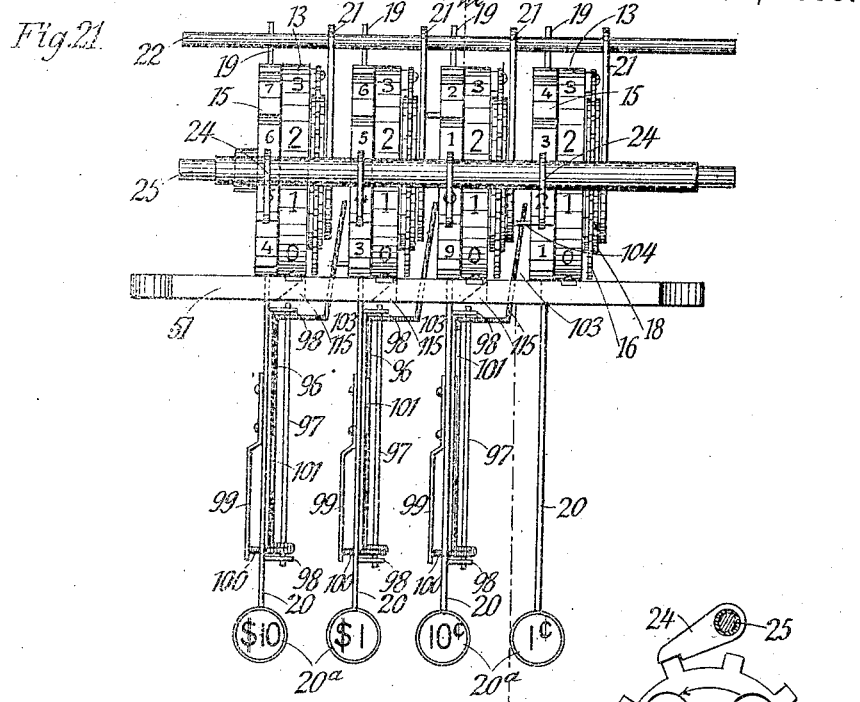
Figure 23:
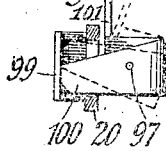
Figure 22:
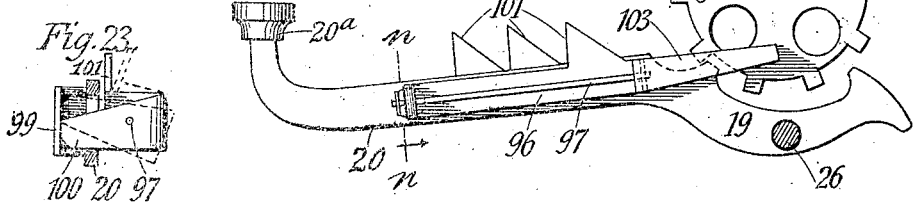
Figure 24:
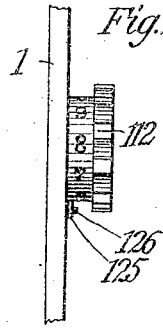

In the accompanying drawings, which illustrate the invention and form a part of this specification, Figure 1 represents a front elevation of the operating mechanism, the front of the case being broken away. Fig. 2 is a side view from the right-hand side of the machine as viewed in Fig. 1, the case being shown in central vertical section. Fig. 2$^a$ is a detail plan view, and Fig. 2$^b$ a side view, of a portion of the resetting mechanism. Fig. 3 is a side view from the left-hand side, the case being omitted. Fig. 4 is a vertical section on the line $a\,a$ in Fig. 1. Fig. 5 is a similar section on the line $b\,b$. Fig. 6 is a horizontal section on the line $c\,c$ in Fig. 3. Fig. 7 is a vertical detail section in the plane indicated by the line $d\,d$ in Fig. 6, looking in the direction indicated by the arrow at the right. Fig. 8 is an enlarged detail view showing the relations of the bell-hammer and the change-lever. Fig. 9 is a section on the line $e\,e$ in Fig. 4. Fig. 10 is a section on the line $f\,f$ in Fig. 9; Fig. 11, a section on the line $g\,g$ in Fig. 10; Fig. 12, a section on the line $h\,h$ in Fig. 9; Fig. 13, a detail view showing the means for controlling the change-lever; Fig. 14, a section on the line $i\,i$ in Fig. 13; Fig. 15, a vertical section on the line $d\,d$ in Fig. 6, looking in the direction indicated by the arrow at the left. Fig. 16 shows, in side and in plan view, the lever or dog for holding the hammer in set position. Fig. 17 shows a section of the main shaft. Figs. 18 and 19 are sections taken, respectively, on the lines $j\,j$ and $k\,k$ in Fig. 17. Fig. 20 is a vertical detail section through the top of the case, showing the means for controlling the screen which hides the permanent register. Fig. 21 is a plan view looking downward from the line $l\,l$ in Fig. 4. Fig. 22 is a section on the line $m\,m$ in Fig. 21. Fig. 23 is a vertical section on the line $n\,n$ in Fig. 22. Fig. 24 is a detail view showing means for preventing overrotation of the permanent register.

Referring to the drawings, 1 1 designate two side plates or standards connected by rods and shafts hereinafter more particularly referred to and designated, the whole constituting a frame for the support of the operating mechanism. 2 designates the main shaft, mounted in bearings in the frame-standards and projecting through the same at both ends, one end being provided with a crank 3 whereby it is adapted to be turned.

At the same side of the machine at which the crank 3 is located and outside of the frame-standard is a segmental rack 4 mounted to swing back and forth on an axis or rod 5, and on the shaft 2 at the side of said rack is a cam 6, (see Figs. 1, 2 and 2$^a$,) which, when the shaft 2 is turned, works against an antifriction-roller 7, mounted on the side of the rack, to throw the latter forward. At the rear the rack is provided with a forwardly-extending arm 8, which stands out from the face far enough to permit the cam to pass back of the same—that is, between the arm and the body of the rack. The cam is formed with an offset arm 9 arranged to pass the roller 7 and carrying at its end an antifriction-roller 10, which wipes against the arm 8 to move the rack backward from its forward position, the cam and its arm 9 thus operating alternately to impart a forward and a backward movement to the rack during each rotation of the shaft 2.

The registering and indicating mechanism comprehends three sets of rotatable wheels, two of which, geared and operating together synchronously, constitute cost or price indicators for indicating individual sales, and the other set a permanent register for registering the aggregate amount of successive sales. Of the two sets of cost-indicating wheels one set is intended to serve as an indicator for the benefit and convenience of the salesman or operator to enable him to observe the operation of the apparatus and to determine when the proper amount has been registered. They also serve as a means for operating the other set, which become visible only on the opening of the till and which are intended for the observation of the purchaser or others in the establishment to exhibit the amount of the sale or to show whether the proper registration has been made.

The sales-indicators are turned back and reset after each operation; but the permanent register-wheels turn constantly forward in the same direction.

Referring now again to the drawings, 13 designates a series of indicator-wheels mounted loosely on a shaft 11 and capable of independent rotation thereon, and above this series, loosely mounted on a rod 12, is a second series 14 preferably larger than those of the first or lower series. These wheels all have on their peripheral surfaces the nine digits and a cipher arranged in regular numerical order and running from the front backward over the top.

Each of the wheels of the two series referred to has attached to the side thereof a sprocket or chain wheel 16, and corresponding wheels of the two series are geared together by chains 17 running on said sprocket-wheels, so that the two wheels of each pair move synchronously in registering and in resetting.

At the sides of the respective indicator-wheels 13, opposite the sprocket-wheels thereon, are four register-wheels 15 constructed as shown in Figs. 3, 5 and 22, with ten spur-teeth, equally spaced and numbered between said teeth to correspond with the indicator-wheels, the numerals running in the same direction. These wheels constitute the permanent register or totalizer of the machine and they are actuated by or through the wheels 13, the latter being impelled by springs 18, and their movements controlled by anchor-escapements 19, provided with key-levers 20, so that by the operation of the latter a step-by-step movement is produced.

The springs 18 are located within the annular sprocket-wheels 16 at the sides of the indicator-wheels 13, one end being attached to said wheels and the other end to plates mounted on the shaft 11 and held against rotation by a rod 22 extending through the same back of the register-wheels.

The wheels 13 are cup-shaped, as shown in Fig. 9, and on the inner side of the rim of each is pivoted a spring-pawl 23, which is thrown out into engagement with the teeth of the adjacent permanent register-wheel, the arrangement being such that when the wheels 13 move forward they carry the permanent register-wheels forward also, and such that the wheels 13 may turn backward independently. Pawls 24 mounted on a rod 25 extending above the wheels 13 15 engage the teeth of the latter and prevent backward rotation.

The escapements 19, mounted to rock on a rod 26, are thrown in one direction by springs 21, and in the other direction by the operator pressing upon the finger-keys 20ᵃ. The pallets of the escapement coact with the teeth of the permanent register-wheels 15, to produce a step-by-step movement, the said wheels moving forward one step for each depression of the keys. It will be thus understood that the springs 18 act directly upon the wheels 13 to drive the same, that these, through their pawls 23, actuate the wheels 15, and that each pair of wheels 13 15 is controlled by an escapement operated through a key-lever, to produce a step-by-step movement.

In the normal position of parts—that is to say, in the position assumed by the parts after each registration and before another registration can be made—the wheels 13 14 stand at zero, with all the zero characters in line opposite the sight-openings 28 29 in the front of the case, from which position they are moved step by step by the manipulation of the finger-keys 20. The two wheels at the right of each series indicate cents and tens of cents, and those at the left dollars and tens of dollars, as usual in registers of this character, the indicating capacity of these wheels thus being ninety-nine dollars and ninety-nine cents. Of course it will be understood that the capacity can be increased to any desired extent by adding wheels at the left.

A registration having been made, the till or cash-drawer 30 is opened to deposit therein the cash received or to make change, which operation, through the instrumentalities hereinafter described, locks the registering mechanism and renders it inoperative, in which condition it remains until the drawer is closed and the indicator-wheels are reset to zero.

At one side of the machine (the left as viewed in Fig. 1) is a lever 31, pivoted on a pin 32, projecting from the frame standard and held up normally by a spring 33. This lever (which may be denominated the "change-lever") extends forward to the front of the machine and is provided at its front end with a finger-key 31ᵃ in range with the finger-keys 20ᵃ, but somewhat lower, (see Figs. 1 and 3,) to enable it to be readily distinguished by its position. In the lower part of the frame is mounted a rock-shaft 34, provided with a crank-arm 35, with which lever 31 is connected by a coupling-link 36, so that when the lever is depressed the shaft is rocked. The shaft is also provided with a second crank-arm 37, which extends in a backward direction, and at the side of said second crank-arm is loosely mounted a vertically-swinging plate 38, notched at its free or swinging end, as at 39, and in the normal position of parts engaging the rear end of the cash-drawer to lock the same. A pin 37ª, projecting from the plate 38, overlies the arm 37, the arrangement being such that when the lever 31 is depressed and the shaft 34 rocked the locking-plate 38 is lifted out of engagement with the drawer to permit the latter to be thrown forward by an ejector, as hereinafter explained.

On the main shaft 2, at the side of the lever 31, is fixed a cup-shaped disk 40, into the open side of which a pin 41 projecting from the side of the lever extends. The annular flange or rim of the disk has a notch 42, which in the normal position of parts stands vertically below the pin 41, so that the latter may pass thereinto or therethrough when the lever is depressed. As soon as the lever is released it returns to normal position under the influence of its spring 33. The purpose of this construction will be explained presently.

At or near its mid-length the main shaft 2 is provided with a backwardly-facing lug or shoulder 43, which, for convenience, we form on a sleeve or collar 42, mounted and made fast on the shaft, and on a rod or axis 44 at the back of the machine we mount a swinging arm 45 which extends forward to said lug or shoulder 43. Below the arm 45 on the shaft 34 is loosely mounted a vertically-swinging arm 46, the rear end of which rests on the back end of the till 30 (see Figs. 7 and 15) and which is connected by a coupling rod or plate 47 with the swinging arm 45, the arrangement being such that when the drawer is closed the arms 45 46 will both be elevated, the former standing above the lug 43, and such that when the drawer is opened they fall to a lower position, the arm 45 then standing in the path of lug 42, whereby the shaft 2 is locked against rotation.

A sale indication and registration having been made the lever 31 is depressed to open the drawer, as above explained. As the drawer moves forward the rear end thereof gradually moves out from under the arm 46, permitting the latter and the arm 45 to fall and lock the shaft 2, the latter being then incapable of rotation so long as the drawer remains open. Change having been made, or the cash received deposited, the drawer is closed, whereby the arm 46 is raised and the shaft 2 unlocked to permit the indicator-wheels to be set back to zero. The construction and operation of the resetting mechanism are as follows: The swinging segmental rack 4 meshes with a gear-wheel 11ª on shaft 11, and by its forward and backward movements, imparted as above explained, imparts reciprocating rotary movement to shaft 11 on which the indicator-wheels 13 are loosely mounted. The said wheels are cup-shaped, as shown in Figs. 8 and 10, and within the same the shaft is provided with fixed radial arms 48, which coming in contact with stops 49 (see Figs. 8 and 9) carry the wheels around also, the range of movement of the rack and the size of gear 11ª being so proportioned that a full movement of the rack from one of its positions to the other imparts a full rotation to the shaft, the latter thus having a full rotation imparted to it by the forward movement, and being returned to normal position by the backward movement of the rack.

When the lever 31 is depressed to unlock the cash-drawer the pin 41 passes through the notch 42, the arrangement being such that when the machine is in operative condition the notch stands immediately below the pin. As soon as the lever is released it returns to normal position, as indicated in Figs. 13 and 14, carrying the pin back within the rim of the disk 40. The initial rotary movement of the shaft 2 (which is rotatable only after the lever 31 has been operated) carries the notch 42 out of coincidence with the pin 41, so that the lever cannot be again depressed during the resetting operation, but remains locked until said operation is completed, from which it will be understood that the drawer having been once opened and closed it cannot be again opened until the resetting is completed and the apparatus restored to operative condition.

As above explained, the wheels 13, impelled by the springs 18, carry the permanent register-wheels 15 forward through the action of spring-pawls 23, the wheels 15 being controlled by the escapements 19 and prevented from rotating backward by pawls 24. The pawls 23 being the only connection between the wheels 13 15, the former are capable of rotating backward independently, while the latter rotate continuously forward, successive sales indications being thus carried over and added to the amount previously registered by the wheels 15.

In the operation of indicating sales the indicator-wheels 13 14, starting from the zero position, effect their highest indication on the completion of the ninth forward step, it being evident that a tenth step would carry them around to the starting-point with the zero characters opposite the sight-openings. They are therefore each limited to nine forward steps or nine-tenths of a rotation, and this is effected by providing them at suitable points with radially-projecting stop-pins 50 which coming in contact with a horizontal bar 51 arrest them on the completion of the ninth forward movement or impulse, with the highost numerals showing through the sight-openings in the case.

The different wheels 13 of the series have no operative connection with each other and are therefore adapted to be operated separately in any order, or all together, as may be found convenient or expedient in practice. Thus, supposing a sale of twenty-three dollars and forty-five cents is to be indicated and registered, the left-hand lever is operated twice, the second lever three times, the third lever four times and the fourth or right-hand lever five times, the corresponding indicator and register wheels controlled thereby being advanced respectively the same number of steps. The operation may however be materially abbreviated by depressing all the levers 20 together twice, then omitting the first or left-hand one and operating the remaining three, then omitting the first two and operating the remaining two, then omitting the first three and operating the last at the right, making in all five operations instead of fourteen, as when the levers are operated separately; or the operation may be reversed beginning at the right and taking up the levers toward the left in reverse order from that in which they are dropped or omitted as above set forth.

Necessarily the sprocket-chains 17, which connect the indicator-wheels 13 14, are small and light and in the ordinary operation of the machine they would be liable to stretch under the strain put upon them by the weight and momentum of the wheels 14 in resetting to zero. In order to avoid this we provide for each wheel 14 a vibrating stop-lever 52 located at the side thereof and mounted on a rod 53. The upper ends of these levers are held back by springs 54, and stand in the paths of laterally-projecting lugs 55 of the wheels, the arrangement being such that as the wheels approach the zero position the lugs strike the levers and carry them forward, putting the springs 54 under tension and gradually taking up the momentum.

56 designates a signal or alarm bell mounted on a support 57, preferably within the frame adjacent to one of the frame-standards 1. 58 is the bell-hammer, in the shape of a reciprocating rod mounted in bearing-lugs 59 60, formed on the inner side of the frame-standard and thrown against the bell by a spring 61, mounted thereon between the lug 60 and a fixed collar 62. The hammer is retracted by a crank-arm 63 on the main shaft 2, said arm 63 being preferably formed on the sleeve 42. When the shaft is rotated to reset the indicator-wheels the arm 63 wipes against the collar 62 and carries the hammer-rod forward to the position shown in Figs. 3 and 5, where a head 65 thereon is engaged and held by a lever 64 fixed on a shaft $65^a$. Said lever lies alongside of and in close proximity to the change-lever and has at its rear end a laterally-projecting pin 66, which underlies the change-lever, the arrangement being such that when the change-lever is depressed to open the drawer, as already explained, the bell-hammer is tripped and the bell sounded.

It will thus be seen that the bell-hammer has no connection with the indicating and registering mechanism, that it is retracted and set in the act of resetting the indicator-wheels after an indication and registration and before the next, and that it is released and the bell sounded simultaneously with the opening of the drawer, while in other crank-machines with which we are acquainted the alarm mechanism is set by the operation of the registering mechanism in the act of making a registration.

The hammer-rod is prevented from turning in its bearing-lugs by a guide-pin 67 projecting through the lug 60.

The hammer-spring 61 should be of such length that it will reach its full expansion just before the hammer strikes the bell, the stroke in such case being completed by momentum after the spring ceases to act. Under such arrangement a spring or elastic buffer $61^a$ located between the head 65 and the frame will throw the hammer back out of contact with the bell after its stroke has been delivered, whereby any interruption or deadening of the sound will be avoided.

In the practical operation and use of this indicator and register it will be found expedient not to reset to zero immediately after making an indication and registration, but to let it remain in unset condition until a new sale is to be indicated and registered, in order that the last indication may remain visible during the interim. Safety, therefore, requires that during such interim a surreptitious opening of the drawer and also a further operation of the indicating and registering mechanism shall be prevented.

We have above described means for preventing the cash-drawer from being opened during the resetting of the indicator-wheels. We find it expedient also to prevent a second opening prior to resetting, and for this purpose we provide the following devices: At the side of the hammer-head 65 is mounted a swinging dog 68, which extends above the head, and on the lever 31 is a pin 69, which when the hammer is in its unset position overlies said dog (see Fig. 8) and prevents the lever from being operated until the hammer has been reset, which is effected during the operation of resetting the indicator-wheels to zero. When the lever is depressed to open the drawer and ring the bell, as already fully explained, the pin 69 passes down behind the dog 68, so that when the hammer in delivering its stroke carries the dog against the pin, the latter arrests the dog and turns it forward on its pivot 70. As soon as the lever is released it returns to normal position under the influence of its spring 33, the pin 69 passing above the dog 68, when the latter snaps thereunder, under the influence of a spring 71, and prevents further operation of the lever so long as the hammer remains unset.

A sale having been indicated and registered and the cash-drawer opened to make change, the registering and indicating mechanisms are locked against further operation by the following means: In the lower part of the frame, on a rod 72 at the rear, is fulcrumed a vertically-swinging lever 73 to which a spring 74 is applied to throw it upward. The lever has near its mid-length a vertical arm 75. On the main shaft 2 is fixed a ratchet-wheel 76 on the side of which is formed a lug 77, which when the wheel and shaft are rotated strikes upon the top of the vertical arm 75 and depresses the lever, the latter being then engaged and held by a swinging arm 78, fixed on the shaft 65ª and having a spring 79 applied thereto to throw it into engagement.

The operation is as follows: The lever 31 being depressed to open the drawer or till, as already explained, its action upon the lever 64 rocks the shaft 65ª and throws the arm 78 out of engagement with the lever 73, when the latter is thrown upward by its spring 74. (See broken lines in Fig. 4.) Beneath the key-levers 30, on a rod 80, is mounted a plate 81, which when the register is in operative condition stands in the position indicated by full lines in Fig. 4, leaving sufficient space between it and the key-levers to permit the latter to be operated. This plate 81 is formed with an arm 81ª which is coupled with the lever 73 by a connecting-link 82, the arrangement being such that when the lever is released and thrown up the plate is turned to the position indicated by broken lines, when its edge stands in close proximity to the key-levers and prevents the latter from being operated, the effect of which is that after the drawer has been opened no further indication or registration can be made until the machine has been reset to zero.

The ratchet-wheel 76 may have any preferred number of teeth, and it is controlled by a pawl 83, mounted on the rod 80 to prevent backward rotation.

At the side of the lever 73 is arranged a dog 84, which is loosely mounted on a rod 85, so as to be capable of swinging back and forth. The leg of this dog has formed in it a cam-slot 86, which inclines upward and forward—that is, toward the front of the machine—and into which a pin 87 carried by the lever 73 projects, the arrangement being such that when the lever is depressed the dog stands in the position shown in Fig. 5. The dog is formed with a horizontally-extending head 84ª, on which is pivoted, as at 84ᵇ, a block 84ᶜ capable of swinging vertically to a limited extent. This block is pressed upward by a spring 88 interposed between the two parts. On the side of the ratchet-wheel 76 is formed a lug 89, which when the shaft 2 is turned to reset the register comes in contact with the block 84ᶜ and arrests the movement. The spring 88 forms a cushion to prevent jar and undue strain.

The lug 89 is so located with reference to the dog 84 and the numerals on the indicator-wheels that it contacts with the dog and arrests the movement at the instant the said wheels reach the zero position.

From the foregoing description it will be understood that after the indicator-wheels have been reset preparatory to a new indication and registration, the parts will stand in the relative positions shown in Fig. 5 and in full lines in Fig. 4, and that when an indication has been made and the drawer opened they stand as shown in broken lines in Fig. 4, the registering and indicating mechanisms being then locked and inoperative; also that the drawer having once been opened and closed cannot again be opened until the indicator has been reset to zero.

90 designates a movable screen mounted on the rod 12 and extending across the indicator-wheels 14, in front thereof. This screen is connected with the lever 73 by a connecting-rod 91 and therefore moves synchronously with the said lever. When the register is in operative condition—that is, when the indicator-wheels 13 14 stand in the zero position after resetting—it stands opposite the sight-opening 29 and hides the indicator-wheels from view, and it remains in this position while the next indication and registration are being made and until the drawer is opened. The operation of opening the drawer releases the lever 73, as already explained, which being thrown up by its spring 74 raises the screen 90 and exposes the indication. When the indicator is reset preparatory to the next operation the lever is depressed and the screen drawn down.

On the shaft 11 is also mounted a screen 93 which extends in front of the indicator and register wheels 13 15 opposite the sight-opening 28. This screen is intended to hide only the permanent register-wheels, and it is therefore provided with openings opposite the wheels 13, these, as before stated, being intended for the benefit of the operator who is thereby enabled to observe the operation of the register and to see when the proper indication and registration have been made.

A rod 94 is pivotally connected with the screen 93 and with the reciprocating bolt of a lock 95, of any preferred style or construction, mounted within the register-case (see Fig. 20) and adapted to be operated from the exterior. By shooting the bolt of the lock the screen is lowered to expose the permanent register-wheels 15 through the sight-opening 28. The lock is supposed to be under the control of the proprietor, or person in charge, who may at any time observe the state of the permanent register by operating the lock.

As will be understood from the foregoing description the several wheels of each series are entirely separate from each other and capable of independent rotation.

As in all permanent registers or adding machines the proper operation requires that the tens be carried over from each wheel of lower order to that of the next higher order—in other words, that on the completion of a full rotation of any wheel of lower order the next higher wheel will be advanced one step, or one-tenth of a rotation. This, in the present case, is accomplished by the following devices: The three key-levers 20 toward the left of the machine, as viewed in Fig. 1, are each provided with a tripping-plate 96, mounted at the side thereof on a pin or axis 97 sustained in laterally-projecting lugs 98. The plates are adapted to rock on their pins or axes and are held at the limit of movement in either direction by flat springs 99 attached to the levers and bearing against the beveled or rounded ends of arms or lugs 100 projecting through openings in the levers. (See Figs. 21, 22 and 23.) Each plate 96 has an angular vertical projection 101 which in one position of the plate stands in the path of movement of a depending lug 115 on the under side of the bar 51, and in the other position permits the said lug to pass. The bar 51 has legs 51ª which are pivotally mounted at their lower ends on a rod or axis 102, on which they are adapted to swing back and forth, as indicated by broken lines in Fig. 3. The lugs 115 are beveled at the rear to form cams which act against the sides of the projections 101 to turn the latter aside and permit the bar to return to its normal position after being swung forward.

At their rear ends the plates 96 are provided with arms 103 which extend into the paths of laterally-projecting pins 104 on the respective register-wheels toward the right, the arrangement being such that on the completion of a full rotation of any wheel 15 its pin will strike and depress the arm 103, rocking the plate 96 and throwing the projection thereon into the path of the lug 115, which co-operates therewith, so that when the bar 51 moves forward thereover the key 20 will be depressed and the register-wheels controlled thereby permitted to take a step forward under the influence of springs 18. This operation takes place on the resetting of the indicator-wheels to zero preparatory to making a new indication and registration, the bar 51 being thrown out by a cam 105 on the left-hand end of the main shaft 2, which cam wipes against an antifriction-roller 106 mounted at the side of the leg 51ª. (See Figs. 1 and 3.) After the cam passes the roller the bar is returned to normal position by a spring or springs 107.

The angular projections of the several levers are arranged at different distances from the fulcrum on which the levers are mounted, the distance increasing from right to left so that when the bar 51 moves out the several key-levers are depressed in succession, the object being to carry the tens of any wheel of lower order over before the wheel of higher order to which they are carried changes its position. Thus supposing all the wheels 15 to stand at the "9" position, the whole registering 99.99, if a registration be made on the right-hand (cents) wheel, the forward movement thereof will trip the plate 96 mounted on the second lever from the right and throw the angular projection 101 thereof into the path of the lug 115 so that in resetting the indicator the bar 51 will depress said second lever and permit the wheel controlled thereby to move forward one step. This will in turn set the plate 96 of the next key-lever so that this will be depressed by the further or continued movement of the bar 51 and so on to the end of the series, each wheel of lower order carrying its tens over before the next wheel to which they are carried moves forward.

It will be noted that since no tens are carried to the first or cents wheel the lever which controls the latter is not provided with a plate 96.

In order to increase the registering capacity of the permanent register without increasing the size of the machine or adding to the operative mechanism, I mount at the side of the left-hand wheel 15, on a spindle 111 projecting from the frame-standard, a small wheel 112, numbered in the same manner as the larger wheels, and also having ten radial teeth which are engaged by a spring-pressed friction-pawl 113 to hold the wheel in position by frictional contact. The spindle on which this wheel is mounted stands in front of the shaft 11, (see Fig. 5,) the position being such that the front of the wheel is in approximately the same vertical plane as the front of the adjacent wheel 15. The wheel 112 is advanced step by step by a pin 114 projecting laterally from wheel 15 and engaging the teeth of the small wheel, the arrangement being such that the small wheel is advanced one step at the completion of each rotation of the wheel 15. Overrotation of the wheel 112 is prevented by means of a stop-pin 126, which projects from the frame into the path of a pin 125 carried by the wheel. (See Fig. 24.)

It has been explained above that the key-levers 20 are locked against operation, while the drawer is open, by the plate 81, connected with, and operated by, the lever 73. Since, however, the lever 73 is depressed and the locking-plate returned to the position indicated in Fig. 5 and also by full lines in Fig. 4, by the initial movement of the main shaft, it follows that without other means for locking the key-levers they would be unlocked, and capable of being operated during the greater part of the rotation of the main shaft. Such additional locking means are provided as follows, whereby, as soon as the resetting operation begins, and before the plate 81 reaches a position to permit their operation, the key-levers are again locked, and kept locked until the shaft completes its rotation, and the indicator is fully reset.

The key-levers 20, which are all alike, are formed with depending projections 108, which stand immediately above the main shaft 2, and on the latter, or preferably on the sleeve 42, (see Figs. 17 and 19,) mounted thereon, are collars 109, which underlie the projections of the respective levers. These collars have openings, or are cut away, as at 110, said openings being disposed with relation to the normal position of the shaft to permit the key-levers to be depressed when the register is in operative condition. These openings gradually increase in extent from right to left, for the purpose of permitting the depression of the several key-levers in succession during the rotation of the shaft to effect the carrying operation as above explained, and the arrangement is such that as soon as a key-lever returns to normal position after being depressed by the bar 51 the collars 109 pass under the projection 108 and lock the levers to prevent further operation until the shaft completes its rotation and the indicator is fully reset to zero. The widest opening 110—that in the collar at the left—is such that the lever controlled by said collar will be locked thereby before it is unlocked by the return of the plate 81 toward its normal position.

The drawer or till 30 is automatically thrown out and opened, when unlocked, by two swinging lever-arms 116 pivoted at 117 in the top of the case, near the respective sides thereof, (see Figs. 1 and 3,) and preferably connected at the top by a cross-bar 116ª which may be integral therewith, the ejector being thus conveniently formed of a single bar of metal bent into inverted-U form. The arms 116 are thrown forward by springs 118 applied at, or near, the pivots on which they swing. At their lower ends they are provided with right-angular forwardly-extending forks 119, which engage laterally-projecting pins 120 at the rear end of the drawer.

In the bottom of the case, at or near the front thereof, are rollers 121 on which the drawer runs, and at its rear end the drawer carries one or more rollers 122 which run under a track rail or rails 123. The swinging ends of the arms 116 travel in curved paths, and by reason of their engagement with the pins 120 impart to the rear end of the drawer a reciprocating vertical movement as it opens or closes. Therefore the portion of the track-rails within the range of movement of the arms 116 is curved, as at 124, to afford the rollers 122 continuous bearing, smoothness of operation being secured thereby.

The range of movement of the swinging arms 116 and the length of the forks 119 are such that the rear end of the drawer is sustained by the latter during at least one-half of its forward movement, after which, the preponderance of weight being in front of the rollers 121, the rear end will be held up during the continued movement until fully open. Preferably the straight front portion of the upper track rail or rails (when more than one is provided) is slightly higher than the plane of the rollers 122 in the closed position, so that after the pins 120 leave the forks the front of the drawer will have a gradually-descending movement in a curved path, the result being ease of movement.

By applying the swinging arms and the springs in the manner shown and described a substantially uniform spring action is available through a relatively long range of movement with but slight expansion, whereas, when the spring is applied directly to the drawer, as heretofore, a long range of expansion is required, with the result that during such expansion the spring gradually loses force, becoming weaker and weaker as the drawer moves forward.

It is manifest that instead of the form of spring shown in the drawings any of the well-known forms, either expanding or contracting, may be used; it being only essential that they be applied at or near the pivotal point of the swinging arms so as to give a wide range of action with relatively slight expansion or contraction.

It is also manifest that the upper prong of the fork 119 may be omitted without impairing the operativeness of the ejector, it being unnecessary to hold the drawer down, and the lower arm being sufficient, in conjunction with the track and rollers, to guide it.

The case A which incloses the operating mechanism is securely closed and is not intended to be opened except for the purpose of making repairs as may be required as the result of careless and violent manipulation, so that no opportunity can be afforded through carelessness in leaving the case open or unlocked for surreptitious tampering with the indicating and registering mechanisms.

It will be noted from the foregoing description that the only function of the key-levers 20 is to operate the escapements, whereby the movements of the register and indicator wheels are controlled, and that therefore they are adapted to be operated with ease and facility, mere touches being required to depress them.

Having now described our invention, we claim—

1. The combination of a system of rotary, spring-impelled indicator wheels, manually operated escapements adapted, and operating, to permit regular, step-by-step movements of said wheels under the influence of their impelling springs, mechanism for re-setting said wheels to zero, and means actuated by the re-setting mechanism for locking the escapements during the re-setting operation.

2. The combination of a system of rotary, spring-impelled, indicator wheels, manually operated escapements arranged and adapted to permit successive step-by-step movements of said wheels under the influence of their impelling springs, a cash drawer, an automatically operating locking device for securing the drawer, a lever for unlocking the drawer, and devices under the control of said lever for locking the escapements on the opening of the drawer.

3. The combination of a system of rotary, spring-impelled indicator wheels, means for controlling the movements thereof, a re-setting mechanism including a rotatable shaft, a cash drawer or till, a vibrating arm controlled and operated by the till to lock the shaft on opening the drawer and to unlock it on closing the same.

4. The combination of a rotary reciprocating shaft, a series of spring-impelled indicator wheels loosely mounted thereon, means for controlling the movements of said wheels, a re-setting mechanism for returning the wheels to zero, the same comprehending a shaft capable of turning in one direction only, gearing actuated by said last named shaft for imparting reciprocatory motion to said first named shaft, and separable connections between the latter and the wheels thereon, as and for the purpose, described.

5. The combination of a rotatable shaft provided with a gear wheel, a segmental rack for driving said gear and shaft, a second rotatable shaft provided with means for imparting reciprocating movements to said rack, spring actuated indicator wheels loosely mounted on the first named shaft, escapements provided with key-levers for controlling the movements of the register wheels, and separable connections between the register wheels and their shaft, whereby rotation of the latter in one direction re-sets the wheels, and whereby the shaft is permitted to return to normal position independently of the wheels.

6. The combination of a rotatable shaft provided with a gear wheel, spring actuated indicator wheels loosely mounted on said shaft, escapements provided with key-levers for controlling the movements of the indicator wheels, a swinging segmental rack in gear with said gear wheel, a main shaft adapted to be turned by hand, a cam and an oppositely extending arm on the main shaft adapted to act on the segment alternately to reciprocate the same, and separable connections between the indicator wheels and their shaft, as and for the purposes described.

7. In a cash register and indicator, the combination with the indicating devices and with the inclosing case, the latter having a sight opening, of a screen movable to, and from, a position opposite said opening, a rotatable shaft and mechanism operated thereby for re-setting the indicating devices to zero, a spring-pressed vibrating lever arranged and adapted to be depressed against the force of its spring by a lug or projection on the shaft, means for automatically engaging and holding said lever in its depressed position, a change lever and intermediate connections for releasing said vibrating lever, and a connection between the latter and the movable screen, substantially as shown and described.

8. In a cash register the combination of a movable cash drawer or till, a swinging bar adapted to engage and lock the drawer in a closed position, a change lever and connections operated thereby to unlock the drawer, a horizontal rotary shaft, a cup-shaped disk thereon adjacent to the change lever, a pin on the lever extending into the open side of said disk, the rim of the latter having a notch which in the normal position of the shaft permits the pin to pass therethrough and the lever to be depressed, whereby after the opening of the drawer and the return of the change lever to normal position the latter is locked by a partial rotation of the shaft.

9. In a cash register the combination with the registering devices, the cash drawer or till and means for locking the drawer, of a reciprocating bell-hammer, means for retracting the hammer, and means for holding it in retracted position, a change-lever for unlocking the drawer and tripping the hammer, the lever having a lateral projection, and a movable dog on the bell-hammer adapted, on the return of the change-lever to normal position, to engage and lock the same.

10. In a cash register the combination of indicating devices adapted to be re-set to zero, an alarm mechanism, a re-setting mechanism adapted to simultaneously re-set the indicating devices and the alarm mechanism, a cash drawer, an automatic locking device for the same, a lever and connections therewith for simultaneously unlocking the drawer and tripping the alarm mechanism, and a locking device connected with the alarm mechanism and adapted, on the return of said lever to normal position to engage and lock the same, whereby a second opening of the drawer is prevented until the indicating devices and the alarm mechanism have been re-set.

11. In a cash register the combination of a system of indicating devices adapted to be re-set to zero, a re-setting mechanism comprehending a rotatable shaft, a movable dog arranged and adapted to lock said shaft on the return of the indicating devices to zero, a vibrating lever operatively connected with said dog and adapted to be operated by a lug or projection on the shaft, means for automatically engaging and holding said lever, a change-lever, and connections therewith for releasing the lever, whereby the locking dog is thrown out of action.

12. The combination of a system of indicating devices adapted to be re-set to zero, a re-setting mechanism comprehending a rotatable shaft, a vibrating lever movable toward and from the shaft, a movable locking dog operatively connected with said lever, a lug on the shaft adapted to depress the lever and throw the locking dog into the path of a second lug or projection on the shaft to prevent over-rotation of the latter, means for locking the lever in its depressed position, and a change-lever arranged and adapted to throw said locking means out of action.

13. The combination of a system of spring-impelled indicating devices, escapements provided with key-levers for controlling the same, a re-setting mechanism for returning the indicating devices, a spring-pressed lever arranged and adapted to be depressed by said re-setting mechanism in the operation of re-setting the indicators, means for holding said lever in its depressed position, a stop-plate mounted on an axis below the key-levers and operatively connected with said spring-pressed lever, and means for releasing the latter, the arrangement being such that on the release of said lever the stop-plate will be turned into position to prevent the operation of the key-levers.

14. The combination of a system of spring impelled indicating devices, escapements provided with key-levers for controlling the same, a re-setting mechanism for returning the indicating devices, a stop-plate mounted on an axis below the key-levers, and adapted to be turned to different positions to permit or prevent the operation of the latter, spring actuated connections for turning said plate into active position, and means connected with, and operated by, the re-setting mechanism for turning it to inoperative position.

15. The combination of a rotary indicator-wheel, a spring impelled driving wheel, chain-gear for imparting synchronous movements from one to the other, means for re-setting to zero, and a spring stop arranged in the path of a projection on one of said wheels to arrest the same with a yielding resistance.

16. In a cash register and indicator the combination of a system of spring-impelled indicator-wheels, escapements provided with key-levers for controlling said wheels, a re-setting mechanism which comprehends a rotatable shaft extending transversely below said escapements, notched or open collars on said shaft below the respective escapements, and projections on the latter adapted to enter the notches or openings in the collars when the register is in operative condition, whereby, during the re-setting operation the escapements are prevented from being operated.

17. The combination of a system of indicating devices adapted to be re-set to zero, a re-setting mechanism which comprehends a rotatable shaft, a crank-arm on said shaft, an alarm mechanism adapted to be set by said crank-arm in the operation of re-setting the register, and means for tripping said alarm mechanism.

18. The combination of a system of indicating devices adapted to be reset to zero, a re-setting mechanism comprehending a rotatable shaft, a crank-arm on said shaft, an alarm mechanism adapted to be set by said crank-arm in the operation of re-setting the register, and a pawl and ratchet to prevent backward rotation of the shaft.

19. In a cash register the combination with the register case and with the sliding drawer therein provided at its rear end with a lateral projection, of a swinging-arm pivoted in the case above the drawer and having at its swinging end a right angular finger which underlies the projection on the drawer, and a spring for actuating the arm whereby the drawer is sustained in its movements.

20. In a cash register the combination with the register case and with the sliding drawer therein of an ejector comprising a swinging-arm pivoted above the drawer and having a separable connection with the rear end of the latter, of a guide rail or track extending longitudinally above the drawer and having a curved portion concentric with the pivot of the swinging-bar, and a roller mounted on the drawer at the rear end thereof and adapted to run in contact with said guide rail or track.

21. In a cash register the combination with the register case and with the drawer or till therein of an ejector comprising a swinging bar pivoted above the drawer and having a separable connection with the rear end thereof, a spring for actuating said arm, a guide rail or track extending longitudinally above the drawer and having a curved portion concentric with the pivot of the swinging arm, a roller mounted on the rear end of the drawer to run in contact with said guide rail or track, and supporting rollers at the front of the case to sustain the drawer in its movements.

In testimony whereof we affix our signatures in the presence of two witnesses.

JOHN B. BENTON.
EDWARD B. HESS.

Witnesses:
HERDER C. WILCOX,
WM. J. KEARNEY.